United States Patent Office

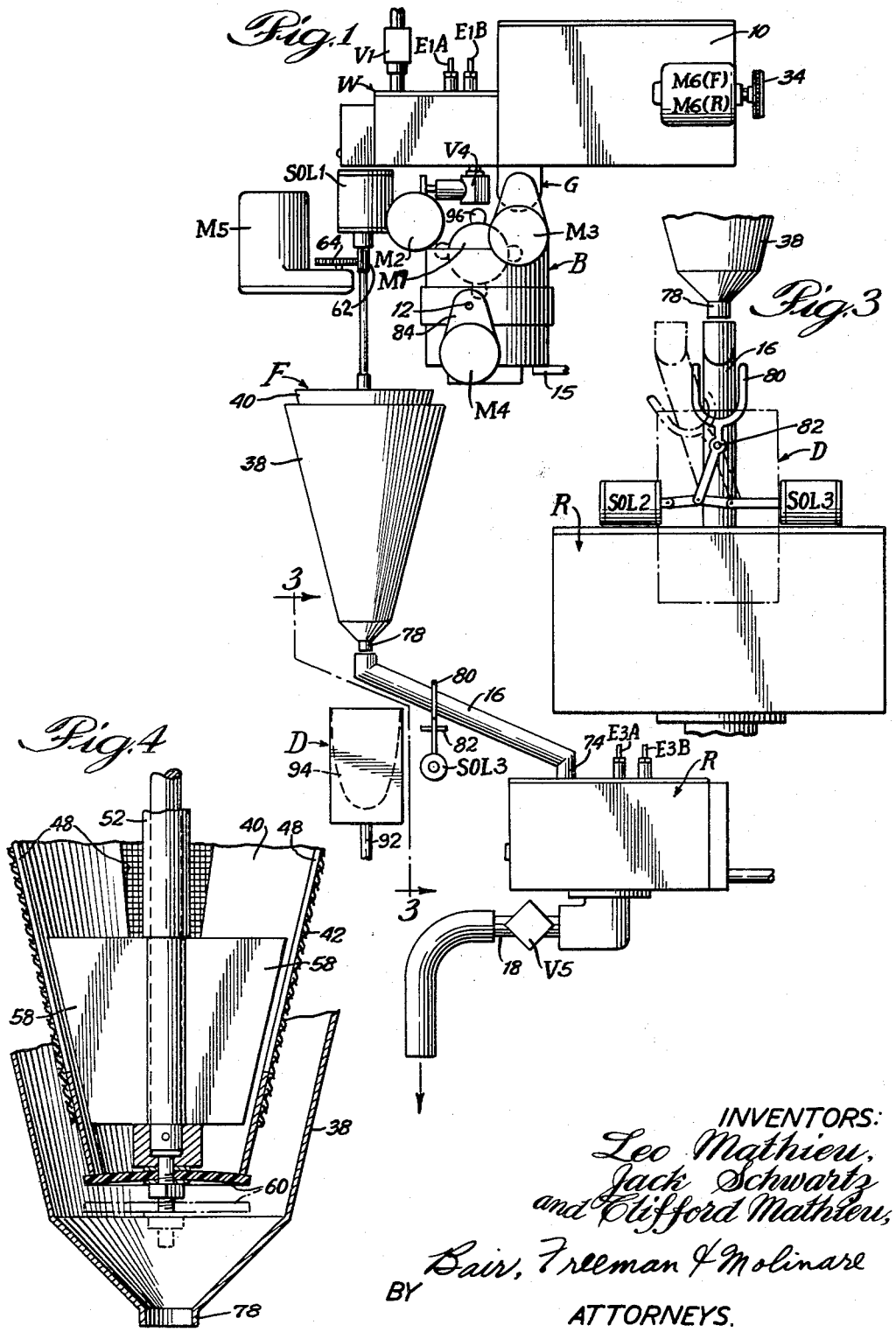

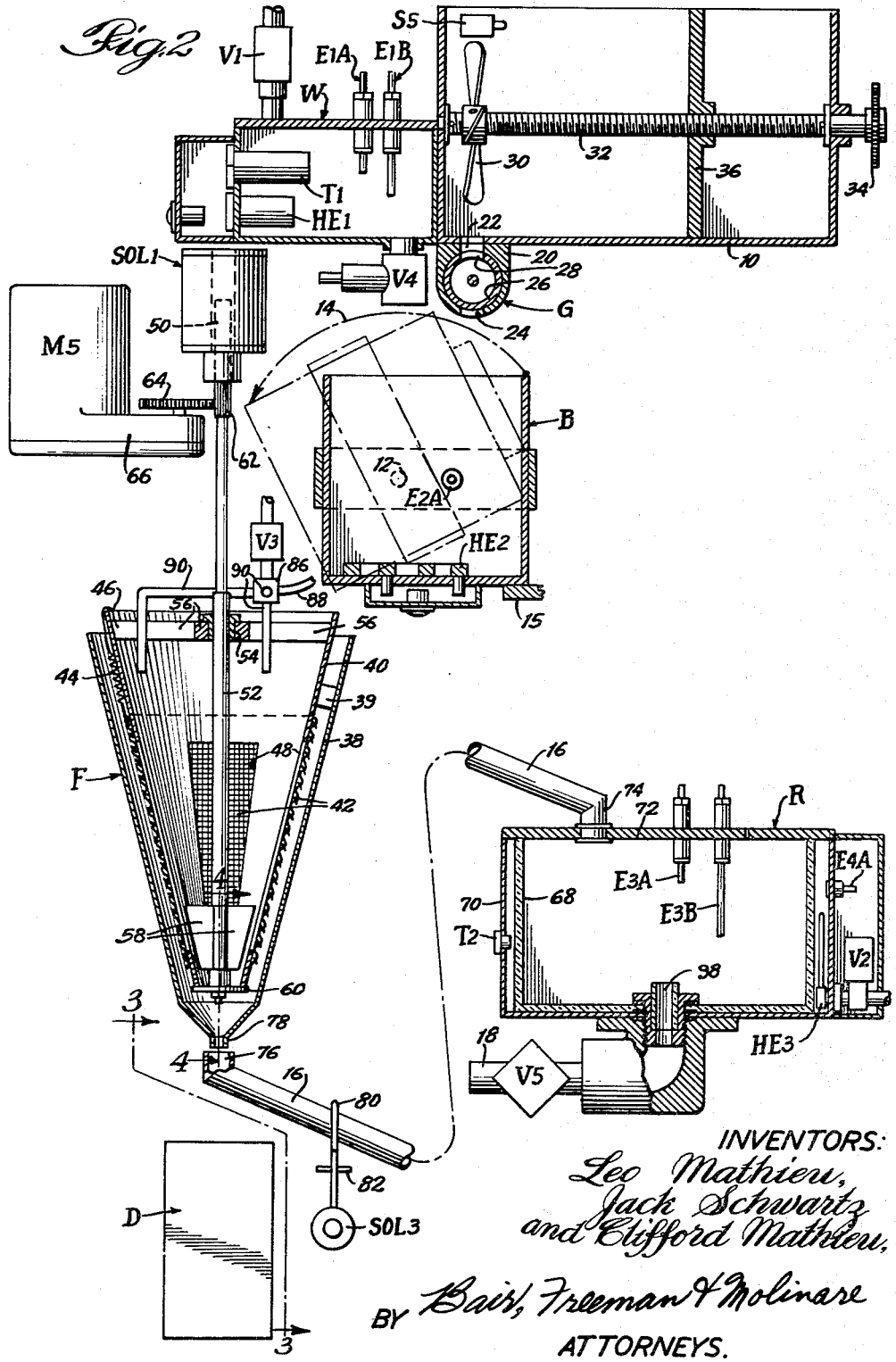

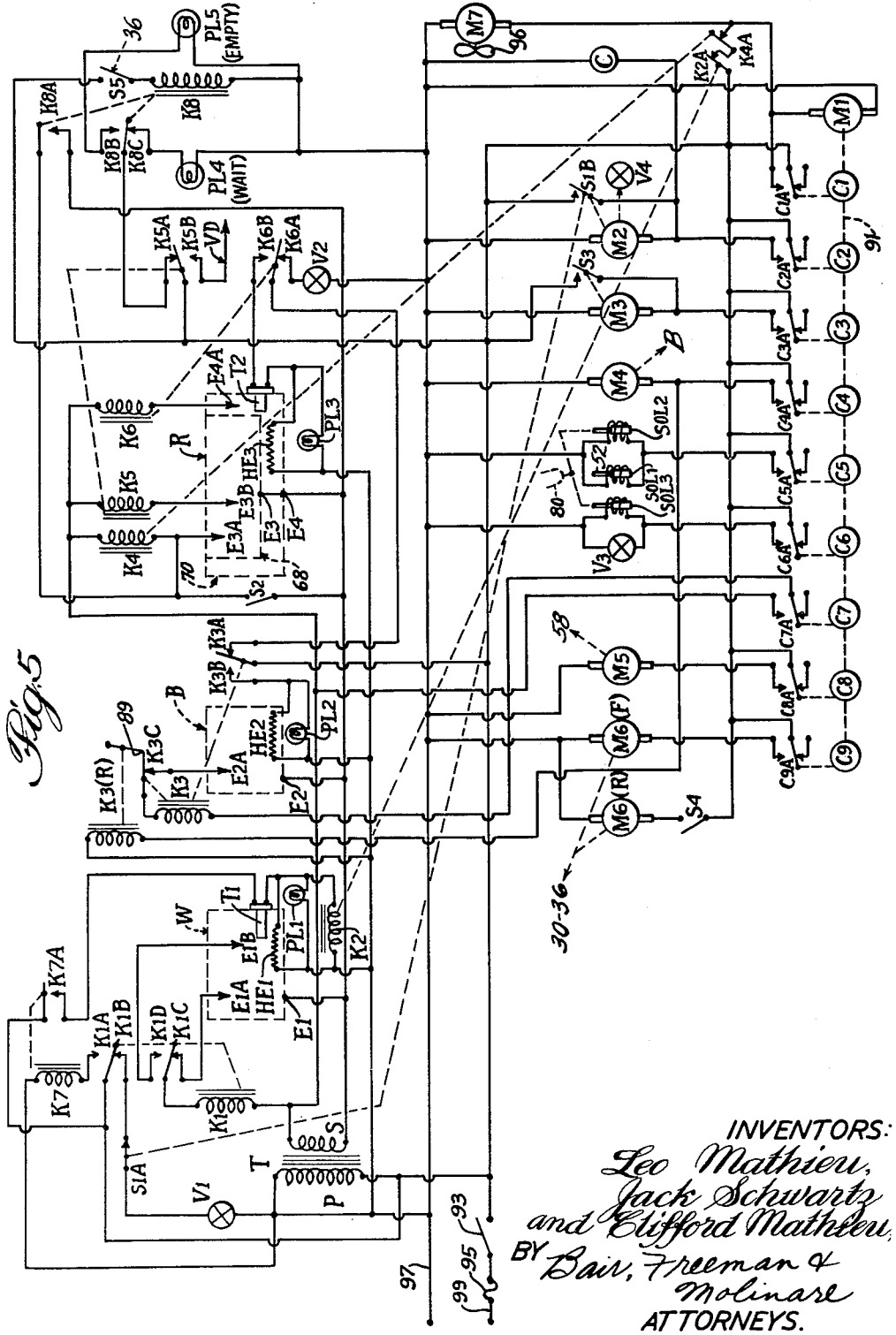

3,171,344
Patented Mar. 2, 1965

3,171,344
AUTOMATIC COFFEE BREWING MACHINE
Leo Mathieu, 5130 W. Adams St., Jack Schwartz, 5219 W. Adams St., and Clifford George Mathieu, 5130 W. Adams St., all of Chicago, Ill.
Filed Apr. 3, 1962, Ser. No. 184,875
17 Claims. (Cl. 99—283)

This invention relates to an automatic coffee brewing machine for producing a reservoir contained quantity of liquid coffee, and may be used in vending machines.

Although coffee is a most popular beverage, and although the dispensing of all types of beverages from vending machines has greatly increased in volume in recent years, the fact remains that no vending machine manufacturer has yet produced a machine for vending hot coffee which is fully acceptable to consumers. There are a number of reasons for this failure to produce a brewed coffee acceptable for vending from automatic equipment. First, coffee is a beverage which requires great skill in preparing. It is extremely essential that a fairly precise amount of coffee be brought into contact with water at a fairly precise brewing temperature for a fairly precise period of time, and it is further necessary that the brewing take place in a clean brew pot and that the brewed coffee thereafter not be subject to contamination of taste from previous brews. Furthermore, it is essential that the coffee brew for only a preselected period of time, after which the coffee should be promptly separated from the coffee grounds which are used in the brewing, and thereafter the coffee should be kept at a relatively non-variable elevated temperature suitable for drinking, without permitting the coffee brew to lose its temperature which might require later reheating that would adversely affect the taste of the coffee.

Heretofore, the dispensing of coffee from automatic dispensing machines has either required the brewing of coffee at a point remote from the machine, so that the vendor actually delivers and deposits quantities of the brewed coffee into a storage compartment in the machine from which the coffee is thereafter dispensed, or in those machines which actually perform both a brewing and storage function, the method of brewing has failed to take into account the requirements as hereinabove set out which would result in the brewing of good-tasting coffee.

Thus, the principal object of this invention is to provide a fully automatic mechanism for the brewing and storage of well-brewed coffee, which mechanism is particularly susceptible of use in an automatic vending machine. As will be seen more fully in the detailed description hereinafter, this invention provides for the depositing of a predetermined amount of fresh ground coffee into a brew pot, together with water, and then providing a timed cycle in which the proper brewing of the coffee is effected, thereafter promptly effecting separation of the hot coffee brew from the used coffee grounds, and transfer of the hot coffee brew to a reservoir wherein the brewed coffee is kept at a carefully controlled temperature appropriate for dispensing to the customer. As part of the entire mechanism and system, means are provided for immediately flushing the brew pot and the filter mechanism with clean water after the coffee brew has been removed therefrom, so that the brew pot and the filtering mechanism are thus completely cleaned for receiving therein and therethrough the next batch of coffee brew and thereby insuring that no undesirable taste is imparted to batches of coffee brewed or filtered thereafter.

One object of the invention is to provide means which is automatically operable to brew and store for use, liquid coffee for dispensation from a vending machine or from a manually operable tap, the brewing machine being capable of handling sufficient ground coffee to produce a considerable quantity of liquid coffee, such as 500 cups, before reservicing and refilling are required.

Another object is to provide a brewing cycle which is of such nature that the resultant liquid coffee is of high quality, a timer being used for timing each step of the brewing cycle, and thermostats being used for controlling temperatures which produce the best quality of liquid coffee from the ground coffee used in the process.

Still another object is to provide a coffee brewing machine having a hopper for ground coffee, a brewing pot for receiving ground coffee and water for brewing the coffee, a filter for separating the grounds from the liquid coffee, and a receptacle for storing the liquid coffee from which it may be dispensed manually if desired, or automatically in a vending machine in response to the deposit of coins therein.

A further object is to provide heating means for the water before it is introduced to the brewing pot, heating means for the reservoir to keep the liquid coffee at drinking temperature until dispensed, thermostats being provided for controlling the heating means for the water tank and the reservoir, and the heating means for the brewing cycle being controlled by the timer.

Still a further object is to provide automatically operable means for discharging the brewed coffee from the brewing pot into the filter and thereafter rinsing out the brewing pot and the filter to get rid of the used coffee grounds before another brewing cycle commences.

An additional object is to provide timing means and a control circuit for the various elements of the brewing machine to operate the machine automatically, the control circuit having a number of interlocks for assuring proper operation of each step of the brewing cycle.

Further objects and advantages of the invention will be apparent upon reference to the following specification and claims, together with the drawings.

FIG. 1 is a somewhat diagrammatic elevation of an automatic coffee brewing machine embodying our invention.

FIG. 2 is a vertical sectional view thereof on a somewhat larger scale.

FIG. 3 is an enlargement of a portion of FIG. 1 as viewed on the indicated line 3—3 of FIG. 1.

FIG. 4 is a further enlarged vertical sectional view on the line 4—4 of FIG. 2 showing details of a filter structure.

FIG. 5 is an electrodiagram showing the elements of our brewing machine and the control circuits therefor.

On the accompanying drawings we have used the reference numeral 10 to indicate a ground coffee hopper in the form of a container, as shown in FIG. 2, adapted to receive ground coffee. Adjacent one end of the hopper 10 a ground coffee dispenser indicated generally at G is provided, below which there is a brewing pot B. A water tank W is located above the brewing pot B and has a motor-operated valve V4 adapted to discharge water from the tank into the pot.

The pot B is adapted to be tilted on a pivot 12, as indicated by arrow 14 to the dot-dash line position illustrated, for dumping its contents into a filter indicated generally at F. Liquid coffee from the filter flows into a transfer tube 16 and discharges into a reservoir R from which it is adapted to be withdrawn through an outlet 18 under the control of a valve V5.

Describing now the elements referred to generally above in more detail, the dispenser G comprises a casing 20 having a reception port 22 and an outlet port 24. A metering sleeve 26 is rotatable therein and has a metering port 28. The port 28 is shown uppermost in FIG. 2 and it is obvious that in this position coffee grounds may flow from the hopper 10 into the sleeve 26. When the sleeve is rotated 180°, the port 28 will be opposite the port 24 for discharging the contents of the sleeve into the brewing pot B. The internal volume of the sleeve 26 determines the metered amount of coffee grounds dispensed. The sleeve 26 may then complete a 360° rotation and will again be uppermost for receiving another metered charge of coffee grounds from the hopper 10.

To prevent packing of the coffee grounds so that they may flow freely from the hopper 10 into the dispenser G, an agitator 30 is provided, secured to a shaft 32. The shaft 32 is rotated by a sprocket 34 thereon, which sprocket is rotated by reversible motor means M6(F)–M6(R), as shown in FIG. 1, the motor being provided with suitable stepdown gearing having an output shaft chained to the sprocket 34 adapted to rotate it only one revolution at a time in accordance with a control circuit which will hereinafter be more fully described. The shaft 32 is threaded through a follower plate 36 in the hopper 10, so that the plate advances toward the left and displaces the ground coffee from the hopper 10 into the dispenser G. The follower plate is closely fitted inside the hopper to prevent leakage of grounds around its edge and is moved in either direction by the threaded shaft 32. The shaft is rotated in one direction by the motor M6(F) to move the follower plate 36 toward the left in FIG. 2 and by the other motor M6(R) in the opposite direction for retracting the follower plate when it is desirable to refill the hopper 10 with ground coffee.

The water tank W is provided with a solenoid-operated inlet valve V1, a heating element HE1, a thermostat T1, and a pair of water-level sensing electrodes E1A and E1B which are connected in the control circuit as will be hereinafter described.

The filter F comprises an outer cone 38 and an inner cone 40. The inner cone 40 is of sheet metal or the like and is rigidly mounted on a frame (not shown) that also supports the hopper 10, the water tank W, the pivot 12 for the brewing pot B, and the reservoir R. Surrounding the inner cone 40, and removably supported in spaced relation to said inner cone 40, is the outer cone 38 which may, for example, be supported from inner cone 40 by a plurality of fins 39. The inner cone 40 serves as a support for a cone-shaped filter sleeve 42 of suitable fabric or fine metal mesh which may be held in supported position by a plurality of coil springs 44 and hooks 46. The inner cone 40 is provided with a plurality of openings 48 to permit the passage of filtered coffee from the inner cone, through filter sleeve 42 and to the annular space between the cones. The removable outer cone 38 permits easy access to the filter element 42, for servicing or replacement.

A solenoid SOL1 is also rigidly mounted on the frame and a core 50 is reciprocable therein, the core being suitably secured to an agitator shaft 52 which depends into the filter F and is rotatable in a bearing 54 supported by a spider 56 of the inner cone 40. Adjacent the lower end of the shaft 52 a pair of agitator blades 58 are provided, below which a valve disc 60 of neoprene or the like is secured to the shaft so that when the solenoid SOL1 is energized, this disc closes the lower end of the inner cone 40, as shown in FIGS. 2 and 4, and when the solenoid is de-energized, the disc is spaced therefrom as to the dotted position shown in FIG. 4. On the shaft 52 is an elongated pinion 62 meshing with a gear 64 driven by stepdown gearing mechanism 66 of a motor M5, which motor is also rigidly supported on the frame.

The reservoir R comprises a liquid coffee container 68, as shown in FIG. 2, immersed in water carried within a metal tank 70 and having a cover 72. One end of the transfer tube 16, indicated at 74, is pivoted in the cover 72 so that the other end thereof, indicated at 76, may swing to a position under a discharge spout 78 of the filter F, as shown in FIG. 2 and by solid lines in FIG. 3, or to a position out of alignment therewith, as shown by dot-and-dash lines in FIG. 3. Such swinging is accomplished by alternate energization of a pair of solenoids SOL2 and SOL3, shown in FIG. 3, which are linked to a fork 80 pivoted at 82 to the frame of the machine.

The brewing pot B is provided with a heating element HE2 and the reservoir R with a heating element HE3. For tilting the pot B on its pivot 12, a motor M4 is provided, having stepdown gearing 84 interposed between the motor and the pivot.

A solenoid-operated rinse valve V3 is mounted over the filter F and discharges to a manifold 86 from which a discharge tube 88 projects, and its discharge is directed upwardly and laterally into the brewing chamber B while it is still in the tilted (dot-and-dash) position of FIG. 2. Three other discharge tubes 90 extend from the manifold 86 into the inner cone 40 for also rinsing this cone, as will hereinafter be described.

A drain receptacle D is provided beneath the discharge spout 78 to receive used coffee grounds and rinse water from the filter F when the transfer tube 16 is in the dot-and-dash line position of FIG. 3. This may be a receptacle for this purpose only, or may be connected as by a pipe 92 to a drain and have a catch bag 94 therein for used grounds while the water passes through the bag to the pipe 92.

By way of general description of the operating cycle, after the ground coffee has been dropped by the dispenser G, valve V4 is opened by the stepdown gearing of a motor M2 which gearing rotates one full revolution and stops. This rotation causes the valve to open and allows the correct amount of heated water from the tank W to be dropped into the brewing pot B, and then recloses. The valve driving means is interlocked with the water inlet system to prevent the addition of any water to the tank W until the outlet valve V4 is in the closed position. When it does reach closed position, the valve V1 is caused to open and the tank is refilled and reheated to be ready for the next brewing cycle.

When the water level in the brewing pot B reaches the electrode E2A, a circuit is completed to energize the heating element HE2, and energization continues for a sufficient length of time to bring the slurry of coffee grounds and water to a full rolling boil and then continues the boiling for approximately 2½ minutes. An exhaust fan 96 adjacent the brewing pot is in operation during the brewing cycle by energization of its motor M7 (FIGS. 1 and 5) to remove the steam and water vapor generated and to discharge same outwardly of the frame or casing (not shown) which encloses the mechanism herein described. This length of time is sufficient to bring out the full rich flavor of the coffee. At the end of this time the heating element is turned off and the slurry of boiling water and coffee grounds is dumped into the filter F, whereupon the liquid coffee passes through the filter mesh 42 to flow into the reservoir R, and the filter mesh retains the coffee grounds. To aid in the filtering process, the agitator 58 is rotated by the motor M5. After all the brewed coffee has been filtered and transferred to the reservoir R via the transfer pipe 16, the transfer pipe 16 is first moved from the full-line position of FIG. 3 to the dot-and-dash line position thereof, and then the valve disc 60 is released from contact with the lower end of the inner cone 40 by deenergization of the solenoid SOL1. At this time rinse water is discharged from the respective pipes 88 and 90 into the brew pot B and inner cone 40, causing the used coffee grounds and residue remaining in the pot B and filter F to be rinsed into the drain receptacle D. The drain receptacle can be constructed in different manners, depending upon local plumbing and sanitation codes. If they are such that it is permissible for used coffee grounds to go directly into the sewer system, the drain receptacle is dispensed with and the spout 78 may discharge directly into the pipe 92 leading to the sewer system. If the codes are such that this is impossible, the tank D may be used as a waste receptacle and fitted with the cloth bag 94 to catch the grounds, while the water is allowed to drain through into the pipe 92 leading to the sewer system. If neither of these systems is permissible, the tank D may be made larger to accept the amount of rinse water and used grounds that would be used between refillings of the hopper 10.

The liquid coffee container 68 of the reservoir R is a heat-resistant glass bowl to prevent any contamination of the flavor of the coffee stored therein. By using the metal tank 70 equipped with the heating element HE3, and a thermostat T2 to control the temperature of the heating element, water in the space between the coffee container 68 and the tank 70 acts as a heat transfer means of the double boiler type. The water level in the tank 70 is controlled by a level sensor electrode E4A and is interlocked so that the heating element HE3 cannot be energized until there is sufficient water in the tank 70. This indirect method of heating minimizes the effects of heater materials on the delicate flavor of the coffee while the thermostat T2 maintains the coffee at proper drinking temperature (approximately 185° F.) without destroying its flavor.

The cover 72 is also provided with sensor electrodes E3A and E3B that are shown schematically. E3A controls the start of the brewing cycle when a predetermined number of cups have been vended, and E3B controls the cut-off mechanism to stop the machine when the reservoir is substantially empty. In the outlet to the valve V5 a riser tube 98 is provided to avoid drawing coffee from the extreme bottom of the reservoir, and thus to minimize the amount of sediment that reaches the customer. This sediment is an inherent characteristic of well-brewed coffee and remains in the container 68 to be dumped out periodically by the serviceman.

As an example of the capacity of our brewing machine, the coffee brewing system herein disclosed may be adjusted to brew six cups of liquid coffee at one time and store the same ready for use. The reservoir R may contain as much as 1½ gallons of brewed coffee and the brewing cycle will be automatically repeated each time six cups of coffee are vended. The hopper 10 may be capable of storing 8 pounds of ground coffee and the dispenser G may be set to deliver 1½ oz. of ground coffee for each brewing cycle. The complete brewing cycle may be timed for a six-minute interval, that is, when the timing cycle starts in response to withdrawal of six cups of coffee, it takes six minutes to complete the cycle. With the sizes and settings suggested, the device is capable of brewing and storing for use 500 cups of high quality liquid coffee without having to be refilled. The sizes and adjustments are, of course, only suggestive and may be varied to suit the needs of a particular vendor.

Referring to FIG. 5, an electrodiagram for the control of the various elements thus far described is shown, wherein supply wires 97 and 99 supply the current for the various components thereof. These wires may be charged at the usual voltage, 110 volts, 60 cycle A.C. A fuse 95 and a power or master switch 93 are illustrated. When the switch 93 is closed, the primary coil P of a transformer T is energized for supplying high voltage and low amperage current from a secondary coil S to the various liquid level sensor electrodes and the circuits controlled thereby. To avoid charging the machine's frame with 110 v. A.C. current, one side (97) of the line is grounded by connection directly to said frame, and a polarized plug is provided for lines 97, 99 for safety reasons.

The first operation that occurs is energization of the solenoid of the water inlet valve V1 so as to fill the water tank W. Such energization is through switch S1A and relay contacts K1B. At the same time, water inlet valve V2 to the water jacket 70 is energized with 110 volt current through relay contacts K3A and K6A. When the water level in the tank W reaches electrode E1A an electrical circuit is completed for relay K1 through relay contacts K1C. This opens contacts K1C and closes contacts K1D which then act as a holding switch for relay K1 as long as electrode E1B remains covered with water. Energization of relay K1 also opens contacts K1B to de-energize solenoid valve V1, and closes contacts K1A to energize relay K7, which closes contacts K7A to energize heating element HE1, pilot light PL1, and relay K2 through thermostat T1. When the water level in tank 70 of reservoir R reaches level-sensor electrode E4A an electrical circuit is completed for relay K6, which opens contact K6A to permit valve V2 to reclose, and closes contacts K6B to energize the heater HE3 and the pilot light PL3 through thermostat T2. The water in the reservoir jacket 70 is now being heated under control of the thermostat.

Switch S5 adjacent the upper right corner of the diagram is in open position as a result of the follower plate 36 being in retracted position. Accordingly, relay K8 is de-energized so that a circuit for a "Wait" pilot light PL4 is established through contacts K5A and K8C, the relay K5 being de-energized at this time because of absence of liquid coffee in the tank 68 contacting electrode E3B. Assuming the follower plate fully retracted or adjacent the righthand wall of the hopper 10, ground coffee may now be added to the hopper, a manually controlled "stand-by—run" switch S2 (to the left of reservoir R) which is manually controlled being placed in "stand-by" (closed) position. This energizes relay K4 opening contact K4A, which prevents a timing motor M1 from being energized and thereby prevents a brewing cycle from occurring until machine is completely serviced. When the machine is ready to start brewing, switch S2 is placed in "run" (open) position, as shown, to de-energize relay K4 which closes contacts K4A. Brew cycle cannot occur at this time, however, because relay K2 is energized, keeping contacts K2A open. When water in tank W reaches proper operating temperature thermostat T1 opens the circuit to heating element HE1, pilot light PL1 and relay K2. With relay K2 de-energized, contacts K2A close to energize the timing motor M1 and a motor M7 for the exhaust fan 96.

The timing motor M1 has a cam shaft 91 on which is mounted a series of timing cams C1 to C9, inclusive, and is adapted to rotate once for a complete 6 minute operating cycle. After slight rotation of the shaft 91, contacts C1A close to provide a holding circuit for the timing motor M1 and the exhaust fan motor M7. Cams C2 and C3 close their respective contacts C2A and C3A just long enough to start the water outlet valve drive motor M2 and the ground coffee metering motor M3. Switches S1A and S1B are directly cam-operated by the water valve motor M2 and a switch S3 is directly cam-operated by the metering motor M3. The switch S1B establishes a holding circuit for the motor M2, while the switch S1A breaks the circuit to valve V1, thus preventing fresh water from entering the tank W while hot water is being drained therefrom through the valve V4. The holding contacts S1B will stop the motor M2 after one complete revolution of its output shaft. Contacts S3, which are normally open, act as holding contacts for the motor M3. They will stop the motor after one complete revolution of its output shaft. Motor M2 will open the outlet valve V4 of the water tank W and close the same during one revolution of its output shaft. A counter C of electromagnetic type to serve as an indicator for the number of cycles of the coffee brewing machine is in parallel with the motor M2 in order to register one count each time motor M2 is energized.

The operation of motors M2 and M3 causes a measured amount of coffee grounds and hot water to enter the brew pot B. When sufficient water has entered the brew pot to reach the electrode E2A a circuit is completed for latching relay K3 through contact K3C. K3C is adjusted to remain closed until a latching mechanism 89 has latched, and to then open. Relay contact K3A opens to de-energize heating element HE3 of the tank 70 and a pilot light PL3. The liquid level sensor E2A is so placed as to prevent energization of HE2 until sufficient water has entered the brew pot to completely cover HE2. Relay contacts K3B close for energizing the heating element HE2 of the brew pot and the pilot light PL2. After a predetermined portion of the brew time, cam-operated switch C5A closes, energizing SOL1 and SOL2. Energization of SOL1 closes the valve disc 60 against the lower end of the filter cone 40 and SOL2 swings the transfer pipe 16 to the full-line position shown in FIG. 3 to receive liquid coffee from the filter F. After a predetermined full brew time, cam-operated switch C4A closes, energizing motor M4 which operates to dump the contents of the brew pot B into the filter F by moving the pot as indicated by the arrow 14 in FIG. 2 to the dot-and-dash line position. Simultaneously with the energization of the motor M4 relay K3(R) is energized to release the latch 89 for the relay K3, thereby opening K3B to de-energize the heating element HE2 and close K3A to re-energize the heating element HE3 for keeping the brewed coffee warm. Operation of the dump motor M4 causes the brew pot B to tip over and dump its contents into the filter F.

Then the cam-operated switch C8A closes, energizing filter agitator motor M5. It is desirable to wait for the dumped coffee to be in the filter before energization of the rapidly rotating agitator 58 so as to prevent splash or throw of the incoming coffee. C8A opens after a short timed interval and after the coffee has been filtered into the reservoir. Entry of the coffee into the reservoir brings liquid into contact with the level-sensor electrode E3B. This completes the circuit for relay K5 causing contacts K5A to open, thus de-energizing the pilot light PL4 while the contacts K5B closes to apply power to the vending device indicated by wire VD, the vending device being of well known construction for being responsive to proper insertion of purchase money and forming no part of our present invention.

During the brewing time cam-operated switch C9A closes for a sufficient time to cause the ground coffee agitator motor M6(F) to rotate forwardly through a given number of turns, while the follower plate 36 is caused to move toward the grounds dispenser G, moving the grounds in the same direction. The motor M6(F)–M6(R) is reversible and its reverse action, indicated M6(R), is manually controlled by the serviceman closing a switch S4 in order to retract the follower plate 36 before he refills the hopper 10. He opens the switch S4 when the plate is fully retracted.

After all the liquid has been drained from the filter F, cam-operated switch C6A closes, energizing SOL3 and V3. SOL3 moves the transfer pipe 16 from the full line position to the dot-and-dash line position of FIG. 3 or away from register with the filter and to the rinse position. Opening of valve V3 discharges rinse water under line pressure to the discharge tubes 88 and 90 for rinsing the brewing pot B and the filter F.

After sufficient rinsing has taken place, cam-operated switch C6A opens, de-energizing V3 and SOL3. At this time cam-operated switch C4A opens, de-energizing brew pot motor M4 and de-energizing relay K3(R). The brew pot's center of gravity, being offset and below the pivot 12, returns the brew pot to its normal upright position. After this has taken place, cam-operated switch C1A opens, stopping the motor M1.

While the above is taking place, water tank W is being refilled via the valve V1, and after sufficient water has entered, valve V1 is closed and heating element HE1 is energized. When proper water temperature is reached the above cycle will repeat as many times as necessary to fill the reservoir R to a level to make contact with the level-sensor electrode E3A. When this happens, relay K4 will be energized, causing contacts K4A to open, preventing further brewing cycles until sufficient coffee has been vended to customers to drop the coffee level in the reservoir below electrode E3A.

Any time between cycles, if the water level in the tank W falls below low-limit sensor E1B, relay K1 will be de-energized, allowing contacts K1B to close. This opens valve V1. When K1 is de-energized, contacts K1A will be opened causing relay K7 to be de-energized, opening contact K7A and thus de-energizing heating element HE1, pilot light PL1, and relay K2.

If at any time between brew cycles, the water level in the water jacket 70 of the reservoir R drops below level-sensor E4A, relay K6 will be de-energized, allowing contact K6A to close, thereby energizing the solenoid of valve V2 to effect refilling the water jacket. If, during normal operation, the coffee reservoir becomes substantially empty, relay K5 will be de-energized because the liquid is no longer in contact with the electrode E3B. Relay contacts K5A will close and the pilot light PL4 (Wait) will be energized through relay contacts K8C.

When all of the ground coffee has been dispensed from the hopper 10, the follower plate 36 in the hopper will be in its most forward position. This causes closure of switch S5, which energizes relay K8. Relay contacts K8A will close, causing operation of relay K4 which will open contacts K4A, preventing further brew cycles. When the brewed coffee is all used up, level-sensor E3B will be uncovered, de-energizing relay K5, whereupon pilot light PL5 (Empty) will be energized through contacts K8B and K5A.

From the foregoing description of the operation of our automatic coffee brewing machine it will be obvious that we have provided the necessary apparatus for properly brewing coffee and storing the same in a reservoir for use in a vending machine, or otherwise. The coffee is brewed in cycles and each step of the operation automatically controlled and interlocked so that at all times the system operates properly and causes shutdown in response to various conditions that would cause improper operation. To brew coffee of high quality, the water must be preheated in the water tank W to about 210° F. in order to bring out the fullest flavor of the coffee, and must be in contact with the coffee grounds for a sufficient length of time. Both of these requirements are met with our brewing machine.

The equipment requires only periodic servicing, which may, for example, consist of operating the follower 36 to permit introduction of ground coffee into the hopper 10, the filling of this hopper, the replacement of filter element 42, the removal of coffee grounds from drain receptacle D, and occasional emptying of sediment from the reservoir R. The switches S2 and S4 are manually manipulated at the time of servicing as above described, and all other steps in the cycle are thereafter automatically performed under the control of the timing motor M1 and the various other conditions required for completing the successive brewing cycles.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. In an automatic coffee brewing machine, a dispensing and metering device for dispensing ground coffee therefrom, a brew pot to receive the ground coffee from said dispensing and metering device, a water tank having means for heating water therein and arranged to deliver heated water to said brew pot, a filter for receiving brewed coffee and grounds, said brew pot being operative to discharge its contents into said filter, a reservoir for receiving the liquid coffee from said filter, and means including said metering device, water tank with heating means, brew pot, filter, and reservoir operating to sequentially discharge ground coffee and heated water into said brew pot, to brew the coffee therein, to discharge the brewed coffee into said filter for flow of filtered coffee only to said reservoir, to thereafter remove the used coffee grounds from said filter, and to thereafter rinse said brew pot and filter.

2. In an automatic coffee brewing machine, a dispensing and metering device for dispensing ground coffee, a brew pot to receive water thereinto and to receive ground coffee from said dispensing and metering device, a filter for receiving brewed coffee and grounds, said brew pot being movable to an attitude for dumping its contents into said filter, a reservoir for receiving the liquid coffee from said filter, and means to automatically cycle said coffee brewing machine to discharge ground coffee and water into said brew pot, to brew the coffee therein, dump the brewed coffee and grounds into said filter for flow of filtered coffee to said reservoir, to thereafter discharge the used coffee grounds from said filter, and to rinse said brew pot, when in said attitude for dumping, and said filter.

3. An automatic coffee brewing machine of the character disclosed comprising a dispensing and metering device for dispensing ground coffee therefrom, a brew pot to receive the ground coffee and water, means to brew coffee in said brew pot, a filter for receiving brewed coffee and grounds, said brew pot being movable to an attitude for dumping its contents into said filter, a reservoir for receiving the liquid coffee from said filter, and means to sequentially discharge ground coffee and water into said brew pot, to operate said brewing means, to dump the contents of said brew pot into said filter, to deliver filtered coffee to said reservoir, thereafter to remove the used coffee grounds from said filter, to rinse said brew pot when in said attitude for dumping and said filter, and to automatically repeat the foregoing cycle until a predetermined level of brewed coffee in said reservoir is attained.

4. An automatic coffee brewing machine of the character disclosed comprising a hopper for ground coffee, a threaded shaft extending throughout the length thereof, an agitator on said shaft to prevent the packing of ground coffee, a follower threaded on said shaft and constrained against rotation whereby rotation of said shaft causes said follower to displace the ground coffee from said hopper, motor means for rotating said threaded shaft, a dispensing and metering device for receiving ground coffee from the hopper, a brew pot to thereafter receive the ground coffee and water, means to brew coffee in said brew pot, a filter for receiving brewed coffee and grounds, said brew pot being operative to discharge its contents into said filter, a reservoir for receiving the liquid coffee from said filter, and means including said hopper, metering device, brew pot, filter and reservoir operating to sequentially discharge ground coffee and water into said brew pot, operate said brewing means, dump the contents of said brew pot into said filter, remove the used coffee grounds from said filter, rinse said brew pot and said filter, and to automatically repeat the foregoing cycle until a predetermined level of brewed coffee in said reservoir is attained.

5. In an automatic coffee brewing machine, a hopper for ground coffee, a threaded shaft extending throughout the length thereof, a follower threaded on said shaft and constrained against rotation whereby rotation of said shaft causes said follower to displace the ground coffee from said hopper, a dispensing and metering device for receiving ground coffee from said hopper, a brew pot to receive the ground coffee from said dispensing and metering device, a water tank having means for heating water therein and discharging heated water to said brew pot, a filter for receiving brewed coffee and grounds, said brew pot being operative to discharge its contents into said filter, a reservoir for receiving the liquid coffee from said filter, and means to automatically cycle said coffee brewing machine to feed ground coffee from said hopper to said dispensing and metering device, and to discharge ground coffee from the dispensing and metering device and heated water from the water tank into said brew pot, to brew the coffee in the brew pot, to dump the brewed coffee into said filter for flow to said reservoir, to remove the used coffee grounds from said filter and to rinse said filter and brew pot.

6. In an automatic coffee brewing machine, a hopper for ground coffee, a dispensing and metering device for receiving ground coffee therefrom, said device comprising a housing having an inlet port through which ground coffee is to be fed from said hopper and an outlet port, a metering sleeve rotatable in said housing and having a port to alternatively register with said inlet port and said outlet port, means for rotating said metering sleeve, a brew pot to receive the ground coffee from said metering sleeve, a water tank having means for heating water therein and arranged to deliver heated water to said brew pot, a filter for receiving brewed coffee and grounds, said brew pot being operative to discharge its contents into said filter, a reservoir for receiving the liquid coffee from said filter, and means to sequentially and automatically cycle said coffee brewing machine to feed ground coffee from the hopper to the dispensing and metering device, energize the means for actuating said metering sleeve, discharge heated water into said brew pot, brew the ground coffee and water therein, dump the brewed coffee into said filter for flow to said reservoir, remove the used coffee grounds from said filter, and rinse said filter.

7. In an automatic coffee brewing machine, a dispensing and metering device for dispensing ground coffee therefrom, a brew pot to receive the ground coffee from said dispensing and metering device, said brew pot being pivotally mounted and adapted by gravity to normally assume an upright position, a motor for pivoting said brew pot to a dumping position and for holding it there, a water tank having means for heating water therein and for discharging heated water to said brew pot, a filter for receiving brewed coffee and grounds, said brew pot being operative to discharge its contents into said filter, a reservoir for receiving the liquid coffee from said filter, and means to automatically cycle said coffee brewing machine to discharge ground coffee and heated water into said brew pot, brew the same therein, energize said motor to dump the brewed coffee into said filter for flow of coffee to said reservoir, remove the used coffee grounds from said filter, and thereafter to rinse said filter and brew pot.

8. An automatic coffee brewing machine comprising a dispensing and metering device for dispensing ground coffee therefrom, a brew pot to receive the ground coffee from said dispensing and metering device, said brew pot being pivotally mounted for movement to a dumping position, a filter for receiving brewed coffee and grounds, said brew pot being operative to discharge its contents into said filter, a reservoir for receiving the liquid coffee from said filter, and means to automatically cycle said coffee brewing machine to sequentially discharge ground coffee and water into said brew pot, brew the same therein, pivot said brew pot to dump its contents into said filter for flow of liquid coffee to said reservoir, and thereafter to remove the used coffee grounds from said filter, rinse said filter, and rinse said brew pot while in dumped position.

9. An automatic coffee brewing machine comprising a dispensing and metering device for dispensing ground coffee, a brew pot to receive ground coffee from said dispensing and metering device, a water tank, an inlet valve and an outlet valve for said water tank, first means for opening said inlet valve, second means for opening said outlet valve, a heating element for said water tank, a thermostat for controlling said heating element, a filter for receiving brewed coffee and grounds, said brew pot being operative to discharge its contents into said filter, a reservoir for receiving the liquid coffee from said filter, and cycling means to automatically cycle said coffee brewing machine to fill and then actuate said dispensing and metering device and to alternately energize said first means solenoid and said second means thereby to discharge ground coffee from the dispensing and metering device and to discharge properly heated water through said outlet valve into said brew pot while said inlet valve is maintained closed, and then to brew the coffee and water in the brew pot, dump the brewed coffee into said filter for flow to said reservoir, remove the used coffee grounds from said filter, and rinse said filter.

10. In an automatic coffee brewing machine, a dispensing and metering device for dispensing ground coffee, a brew pot to receive ground coffee from said dispensing and metering device, a filter for receiving brewed coffee and grounds, said brew pot being operative to discharge its contents into said filter, said filter comprising an outer cone having a discharge spout, an inner filter cone therein provided with a filtering surface, a closure valve for the lower end of said inner cone, a solenoid for effecting closure thereof, an agitator for agitating the slurry of ground coffee and hot water received from said brewing pot, a motor for rotating said agitator, a flush valve for said inner cone and flushing tubes extending therefrom to discharge into said cone and into said brewing pot when in dumped position, a transfer tube for receiving filtered coffee from said filter and conducting it to said reservoir, a waste receiver associated with said filter, means for actuating said transfer tube to one position to receive filtered coffee from said filter when discharged from said spout of the outer filter cone and to another position permitting the used coffee grounds and rinse water to be discharged from said filter into said waste receiver during the flushing of said filter, a reservoir for receiving the liquid coffee from said filter, and means to automatically cycle said coffee brewing machine to discharge ground coffee and heated water into said brew pot, brew the same therein, dump the brewed coffee into said filter for flow to said reservoir, remove the used coffee grounds from said filter by de-energizing said solenoid to open said closure valve and rinse said filter and brew pot by opening said flush valve.

11. In an automatic coffee brewing machine, a dispensing and metering device for dispensing ground coffee, a brew pot to receive ground coffee from said dispensing and metering device, a filter for receiving brewed coffee and grounds, said brew pot being operative to discharge its contents into said filter, said filter comprising an outer cone having a discharge spout, an inner filter cone therein provided with a filtering surface, a closure valve for the lower end of said inner cone, means for effecting closure thereof, an agitator for agitating the slurry of ground coffee and hot water received from said brewing pot, a motor for rotating said agitator, a flush valve for said inner cone and flushing tubes extending therefrom to discharge into said cone and into said brewing pot when in dumped position, a transfer tube for receiving filtered coffee from said filter and conducting it to said reservoir, means for actuating said transfer tube to one position to receive filtered coffee from said filter when discharged from said spout of the outer filter cone and to another position permitting the used coffee grounds and rinse water to be discharged from said filter when it is being rinsed, a reservoir for receiving the liquid coffee from said filter, and means to automatically cycle said coffee brewing machine to discharge ground coffee and water into said brew pot, brew the same therein, dump the brewed coffee into said filter for flow to said reservoir, remove the used coffee grounds from said filter by opening said closure valve and rinse said filter and brew pot.

12. In an automatic coffee brewing machine, a dispensing and metering device for dispensing ground coffee therefrom, a brew pot to receive the ground coffee from said dispensing and metering device, a water tank having means for heating water therein and discharging heated water to said brew pot, a filter for receiving brewed coffee and grounds, said brew pot being operative to discharge its contents into said filter, a reservoir for receiving the liquid coffee from said filter, a liquid level sensor electrode in said reservoir, a timing motor to automatically cycle said coffee brewing machine to discharge ground coffee and heated water into said brew pot, brew the same therein, dump the brewed coffee into said filter for flow to said reservoir, remove the used coffee grounds from said filter and rinse said filter and brew pot, and means for initiating operation of said timing motor in response to lowering of liquid coffee in said reservoir to a predetermined level determined by said sensor electrode therein.

13. An automatic coffee brewing machine comprising a dispensing and metering device for dispensing ground coffee therefrom, a brew pot to receive the ground coffee from said dispensing and metering device, a filter for receiving brewed coffee and grounds, said brew pot being movable to an attitude to dump its contents into said filter, a reservoir, a transfer tube for receiving filtered coffee from said filter and for conducting it to said reservoir, said transfer tube being movable between a first position in which it receives filtered coffee from said filter and another position permitting the used coffee grounds and rinse water to be discharged from said filter, a jacket for said reservoir, a heating element for liquid in said jacket, a thermostat for controlling said heating element, and means to automatically cycle said coffee brewing machine to discharge ground coffee and water into said brew pot, brew the coffee therein, move the brew pot to dump the brewed coffee into said filter for flow to said reservoir, remove the used coffee grounds from said filter, and rinse said filter and brew pot when in said attitude for dumping.

14. In an automatic coffee brewing machine, a hopper for ground coffee, a threaded shaft extending throughout the length thereof, a follower threaded on said shaft and constrained against rotation whereby rotation of said shaft causes said follower to displace the ground coffee from said hopper, a dispensing and metering device for ground coffee from the hopper, said device comprising a housing having an inlet port to said hopper and an outlet port, a metering sleeve rotatable in said housing and having a port to alternatively register with said inlet port and said outlet port, a brew pot to receive the ground coffee from said outlet port, said brew pot being pivotally mounted, a water tank having means for heating water therein and discharging heated water to said brew pot, a filter for receiving brewed coffee and grounds, said brew pot being operative to discharge its contents into said filter, a reservoir for receiving the liquid coffee from said filter, and means to automatically cycle said coffee brewing machine to rotate said threaded shaft and said metering sleeve to discharge ground coffee and heated water into said brew pot, brew the same therein, pivot said brew pot to dump the brewed coffee into said filter for flow to said reservoir, remove the used coffee grounds from said filter, and rinse said filter and brew pot.

15. In an automatic coffee brewing machine, a hopper for ground coffee, a threaded shaft extending throughout the length thereof, an agitator on said shaft to prevent the packing of ground coffee, a follower threaded on said shaft and constrained against rotation whereby rotation of said shaft causes said follower to displace the ground coffee from said hopper, a dispensing and metering device for receiving coffee from the hopper and comprising a housing having an inlet port to said hopper and an outlet port, a metering sleeve rotatable in said housing and having a port to alternatively register with said inlet port and said outlet port, a brew pot to receive the ground coffee from said metering sleeve, said brew pot being pivotally mounted, a water tank, a heating element for said water tank, a thermostat for controlling said heating element, a filter for receiving brewed coffee and grounds, said brew pot being operative to discharge its contents into said filter, said filter comprising an outer filter cone, an inner filter cone therein provided with a filtering surface, a closure valve for the lower end of said inner cone, a transfer tube for receiving filtered coffee from the outer cone of said filter and for conducting it to said reservoir, means for actuating said transfer tube to receive filtered coffee from said filter when in one position and permitting the used coffee grounds and rinse water to be discharged from said filter when in another position, a reservoir for receiving the liquid coffee from said filter, a jacket for said reservoir, a heating element for liquid in said jacket, a thermostat for controlling said heating element, and means to automatically cycle said coffee brewing machine to discharge ground coffee and heated water into said brew pot, brew the same therein, dump the brewed coffee into said filter for flow to said reservoir, remove the used coffee grounds from said filter by opening said closure valve and rinse said filter and brew pot.

16. An automatic coffee brewing machine of the character described comprising a dispensing and metering device for dispensing ground coffee therefrom, a brew pot to receive the ground coffee from said dispensing and metering device, a filter for receiving brewed coffee and grounds, said brew pot being operative to discharge its contents into said filter, said filter comprising an outer cone, an inner filter cone therein provided with a filtering surface, a closure valve for the lower end of said inner cone, an agitator in the inner cone for agitating the slurry of ground coffee and hot water received from said brewing pot, a reservoir, a transfer tube for receiving filtered coffee from said filter and for conducting it to said reservoir, means for actuating said transfer tube between one position to receive filtered coffee from said filter and another position permitting the used coffee grounds and rinse water to be discharged from said filter, a heated reservoir for receiving the liquid coffee from said filter and maintaining same at drinking temperature, and means to automatically cycle said coffee brewing machine to discharge ground coffee and heated water into said brew pot, brew the same therein, dump the brewed coffee into said filter for flow to said reservoir, drain the used coffee grounds from said filter by opening said closure valve and rinse said filter and brew pot.

17. In an automatic coffee brewing machine, a dispensing and metering device for dispensing ground coffee, a brew pot to receive ground coffee from said dispensing and metering device, a filter for receiving brewed coffee and grounds, said brew pot being operative to discharge its contents into said filter, said filter comprising an outer filter cone, an inner filter cone therein provided with a filtering surface, a closure valve for the lower end of said inner cone, a flush valve for said inner cone and flushing tubes extending therefrom to discharge into said inner cone and into said brewing pot when in discharge position, a transfer tube for receiving filtered coffee from said filter and for conducting it to said reservoir, means for actuating said transfer tube between one position to receive filtered coffee from said filter and another position permitting the used coffee grounds and rinse water to be discharged from said filter, a reservoir for receiving the liquid coffee from said filter, and means to automatically cycle said coffee brewing machine to discharge ground coffee and water into said brew pot, brew the same therein, discharge the brewed coffee into said filter for flow to said reservoir, remove the used coffee grounds from said filter by opening said closure valve and open and reclose said flush valve to effect flushing of said brew pot and filter.

References Cited in the file of this patent

UNITED STATES PATENTS

| | | |
|---|---|---|
| 1,665,728 | Canright | Apr. 10, 1928 |
| 1,668,540 | McAllen | May 1, 1928 |
| 2,016,281 | Harper | Oct. 8, 1935 |
| 2,433,054 | Lime | Dec. 23, 1947 |